Patented Aug. 21, 1928.

1,681,361

UNITED STATES PATENT OFFICE.

RICHARD PASTERNACK, OF BROOKLYN, NEW YORK, ASSIGNOR TO CHARLES PFIZER & COMPANY, OF BROOKLYN, NEW YORK, A CORPORATION OF NEW JERSEY.

LAXATIVE.

No Drawing.  Application filed October 30, 1925.  Serial No. 65,884.

This invention relates to a laxative and process of manufacture thereof and has for its object to provide a new and hitherto unrecognized product having the valuable therapeutical qualities of phenolphthalein but of several times the strength. The new product which I call "phenol and phthalic anhydride derivative" comprises residues obtained in the manufacture of phenolphthalein from phenol and phthalic anhydride. These residues have heretofore been thrown away as of no value after extraction of substantially all the phenolphthalein. These residues, as I have discovered, are nontoxic and have many times the activity of phenolphthalein itself, although containing only a minor percentage of phenolphthalein. Phenolphthalein is crystalline, and according to U. S. Pharmacopeia, Tenth Revision, should have a melting point not below 256° C. and is ordinarily a white or yellowish white powder. I have further discovered that an entirely new product, having still greater activity, can be isolated from these residues. This new product varies in melting point between about 130° C. and 200° C. and is of yellow or ochre color having a laxative strength between thirty and fifty times that of phenolphthalein. When this compound is melted, phenol is given off. It is also nontoxic in proper quantities.

Phenolphthalein is usually prepared by condensation with heat 10 parts of phenol with 5 parts of phthalic anhydride and 4 parts of concentrated sulphuric acid at 120° C., for about ten to twelve hours, when the following reaction takes place:

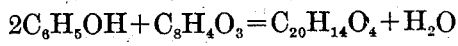

$$2C_6H_5OH + C_8H_4O_3 = C_{20}H_{14}O_4 + H_2O$$

from which it will be seen that sulphuric acid acts simply as a dehydrating agent. In all phenolphthalein processes, phenol and phthalic anhydride, of course, are necessary ingredients, but variations are often made as to the condensation or the dehydrating agent, which in the above process is sulphuric acid. In place of sulphuric acid, other substances may be used, such as zinc chloride, tin chloride, aromatic sulphonic acids, or a combination of these compounds and sulphuric acid or zinc chloride, etc. This reaction results in the delivery of the original crude phenolphthalein, which, after washing to free it from the dehydrating agents and some other by-products, is dissolved in an alkali, filtered to remove insoluble matter, and then precipitated with an acid such as acetic or sulphuric. This impure 90-95% phenolphthalein precipitate is washed with water, dissolved in alcohol or other solvent, and phenolphthalein crystallized by alternate evaporation and cooling. These amounts recovered are recrystallized as often as necessary to produce phenolphthalein of the required purity. The alcoholic mother liquors used for these purifications finally become so loaded with residues that it is impossible to recover further quantitites of phenolphthalein. When this point has been reached, the alcohol is recovered by distillation and the residues discarded. These residues may contain as much as 25% unrecoverable phenolphthalein, but I have discovered them to be about 20 to 30 times as active as phenolphthalein.

My new and still more active product is obtained from this residue after phenolphthalein recovery by ether extraction, it being readily soluble in ether, whereas phenolphthalein is only sparingly soluble. This new product is non-crystalline. After the residues have been stirred with ether for several hours, the solution is filtered and the filtrate evaporated to dryness. The residues from this first filtrate may be again extracted with ether, filtered, and the filtrate evaporated to dryness to obtain a product of greater activity. Fractional precipitation with acids from an alkaline solution of phenolphthalein residues will also produce this new product but containing more phenolphthalein.

The method above given for producing phenolphthalein residues is simply given by way of example, inasmuch as there are numerous other methods giving laxative residues, and from which my new and more active product may be isolated, and I therefore do not restrict myself to phenolphthalein residues derived from any particular method nor to any particular solvent, except as specifically stated in the claim.

I claim:

As a new product, an amorphous substance having laxative properties and melting at below 200° C., and which may be formed by treating phthalic anhydride and phenol with the usual condensing agents to form phenolphthalein, extracting the reaction product with alkali, reprecipitating the alkaline solution, dissolving the precipitate by means of a suitable solvent, crystallizing out the phenolphthalein, and extracting the new product from the residue after crystallization by means of ether.

Signed at Brooklyn, in the county of Kings and State of New York this 27th day of October, A. D. 1925.

RICHARD PASTERNACK.